Patented May 25, 1954

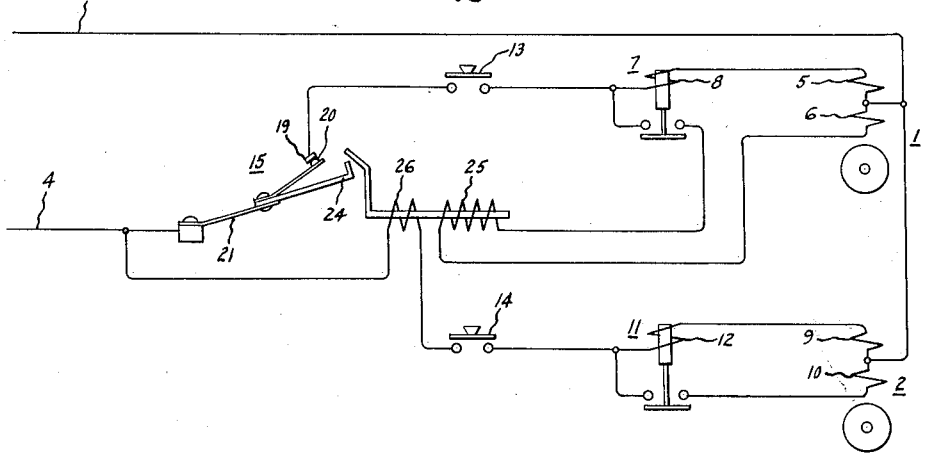
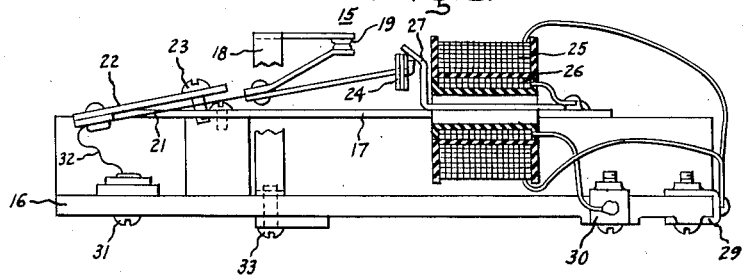
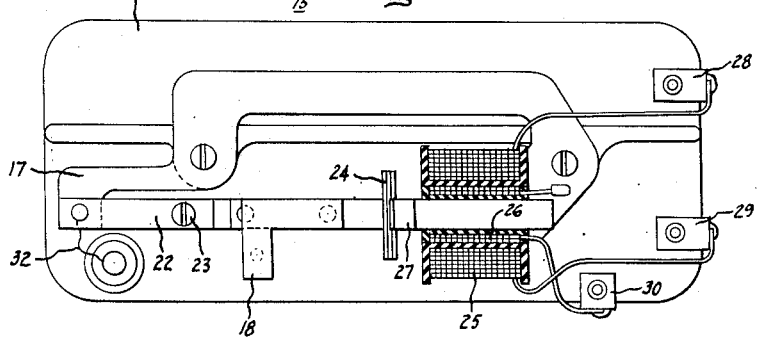

2,679,623

UNITED STATES PATENT OFFICE 2,679,623

MOTOR STARTING CONTROL

Howard A. Wyman, Jr., Framingham, Mass., assignor to General Electric Company, a corporation of New York Application November 18, 1952, Serial No. 321,111

3 Claims. (Cl. 318—102)

1

This invention relates to starting devices for electric motors and has as its principal object the provision of a simple self-contained device for preventing the simultaneous starting of a pair of motors connected in the same electrical circuit.

Further objects and advantages of my invention will become apparent as the following description proceeds and the features of novelty which characterize my invention will be pointed out with particularity in the claims annexed to and forming a part of this specification.

Briefly stated, in accordance with one aspect of my invention, I provide an electromagnetic relay having a pair of contacts connected in the electrical supply line of a first motor and a pair of operating coils, one of which is connected in series with the starting winding of the first motor and the other of which is connected in the electrical supply of the second motor. The electrical characteristics of the two operating coils are so proportioned that the relay contacts open only when both motors are started simultaneously and are maintained in open position until the second motor reaches its operating speed.

For a better understanding of my invention, reference may be made to the accompanying drawing in which Figure 1 is a diagrammatic view of a motor control system arranged in accordance with my invention.

Figure 2 is a side elevation view, partly in section, of a relay embodying my invention.

Figure 3 is a top plan view, partly in section, showing the relay illustrated in Figure 2.

Referring to Figure 1 of the drawing, the numerals 1 and 2 designate a pair of electric motors connected in parallel to a source of electrical energy by a circuit including supply lines 3 and 4. While my invention may be utilized to control the starting of any pair of motors connected in this manner, motors 1 and 2 are typical of the motors employed in many dual motor electrical appliances such as food freezers, refrigators and air conditioning units. Such appliances are usually operated from electric circuits of limited capacity such as lighting circuits of residences and stores and therefore, the maximum current demand of such appliances must be limited to the current carrying capacity of the circuit.

Motor 1 includes a running winding 5 and a starting winding 6 and is provided with a starting relay 7 arranged to energize starting winding 6 when the current in the operating coil 8 of

2 relay 7 exceeds a predetermined value such as the normal running current of motor 1. Similarly, motor 2 includes a running winding 9 and a starting winding 10 and is provided with a starting relay 11 arranged to energize starting winding 10 when the current in operating coil 12 of relay 11 exceeds a predetermined value such as the normal running current of motor 2. Motor 1 is controlled by a control switch 13 connected in series with starting relay 7 while motor 2 is controlled by a control switch 14 connected in series with starting relay 11. Control switches 13 and 14 are independently and separately actuated in any suitable manner in accordance with the demands of the devices driven by motors 1 and 2 respectively.

To prevent an excessive flow of current which would be caused by the simultaneous starting of motors 1 and 2, I have provided the relay device designated by the numeral 15 in Figure 1 and illustrated in detail in Figures 2 and 3. Relay device 15 comprises a molded plastic base 16, a metal frame 17, a contact supporting bracket 18, a fixed contact 19 and a movable contact assembly including movable contact 20, flexible arm 21, support bracket 22, adjusting screw 23 and armature 24. Movable contact 20 is actuated by a pair of coaxial operating coils 25 and 26 wound on iron core member 27. As shown in Figures 2 and 3, the lead wires of coil 25 are connected to terminals 28 and 29 while one lead wire of coil 26 is connected to terminal 30 and the other lead wire is grounded to frame 17, as is movable contact 20 through the support 22. Terminal 31 is connected by wire 32 to frame 17, and terminal 33 is electrically connected to fixed contact 19 through bracket 18 so as to permit my relay device to be connected in an electrical circuit as shown in Figure 1.

Referring to Figure 1 of the drawing, operating coil 25 is connected in series with the starting winding 6 of motor 1 and thus is energized only by the current in the starting winding of that motor. Coil 26, on the other hand, is connected in series with control switch 14 and thus is energized by both the starting and running currents of motor 2. It will be noted that coil 25 has more turns than coil 26, the exact number of turns in each coil being determined by the electrical characteristics of motors 1 and 2. For example, if motors 1 and 2 are identical and each draws a starting current of approximately 20 amperes including a current of 4 amperes in the starting winding and each draws a running current of approximately 7 amperes, coil 25 should have approximately 3 times as many ampere-turns as coil 26. In any event, the ampere-turn ratio of coils 25 and 26 should be such that movable contact 20 is moved to open circuit position only when the total starting current of motor 2 flows through coil 26 and a current equal to the current flowing in starting winding 6 of motor 1 flows through coil 25. Furthermore, coils 25 and 26 should be so proportioned that movable contact 20 is maintained in open circuit position by the starting current of motor 2 alone.

In operation, my improved control system prevents the simultaneous starting of motors 1 and 2, but does not determine the starting sequence. Thus, if motor 1 is running and control switch 14 closes, motor 2 will start without interrupting the operation of motor 1 because the starting current of motor 2, which flows through operating coil 26, does not produce enough flux to open contacts 19 and 20. Conversely, if motor 2 is running and control switch 13 closes to start motor 1, movable contact 20 will remain in closed circuit position as shown in Figure 1 because the flux produced by the running current of motor 2 (in coil 26) plus the current flowing in starting winding 6 (and in coil 25) is insufficient to actuate armature 24. However, if neither motor is running and control switches 13 and 14 close simultaneously, for example, when power is restored after an interruption of service, relay device 15 will open the circuit to motor 1 and hold it open until motor 2 has started. As previously stated, the total starting current of motor 2 plus the starting winding current of motor 1 is sufficient to open contacts 19 and 20 and the total starting current of motor 2 alone is sufficient to maintain them in this position.

While I have shown and described a specific embodiment of my invention, I do not desire my invention to be limited to the particular construction shown and described, and I intend, by the appended claims, to cover all modifications within the true spirit and scope of my invention.

What I claim as new and desire to secure by Letters of the United States is:

1. In a control system for a pair of motors, the combination of a first motor circuit including a first control switch, a second motor circuit including a second control switch, and an electro-magnetic relay including a pair of normally closed switch contacts connected in said first circuit, a first operating coil connected in said first circuit, and a second operating coil connected in said second circuit, said relay being constructed and arranged to open said first circuit only if said first and second switches are closed simultaneously so as to cause the starting currents of both motors to flow through said first and second coils respectively.

2. In a motor control system, the combination of a pair of motors, each having a starting winding and a running winding, a source of electrical energy, a first control switch for connecting one of said motors to said source, a second control switch for connecting the other of said motors to said source, and an electro-magnetic relay connected in series with said first control switch, said relay comprising a pair of switch contacts and a pair of coaxially mounted operating coils, one of said coils being connected in series with said second control switch and the other of said coils being connected in series with the starting winding of said one of said motors, said relay being constructed and arranged to open said switch contacts only when the starting currents of both motors flow through said coils, thus preventing the starting of both of said motors simultaneously.

3. In an electro-magnetic relay adapted to prevent the simultaneous starting of two motors, the combination of a fixed contact, a movable contact associated with an armature and a pair of coaxially wound coils arranged to cooperate with said armature to control the position of said movable contact, the windings of said coils being so proportioned that when one coil is connected in circuit with one of said motors and the other coil connected in circuit with the other of said motors, said contacts are opened only when the respective starting currents of both motors flow through said coils simultaneously.

References Cited in the file of this patent

UNITED STATES PATENTS

| Number | Name | Date |
| --- | --- | --- |
| 1,953,941 | Anderson | Apr. 10, 1934 |
| 2,011,851 | Cobb | Aug. 20, 1935 |
| 2,354,787 | Addicks | Aug. 1, 1944 |
| 2,585,987 | Andrews | Feb. 19, 1952 |